(12) United States Patent
Yamashita

(10) Patent No.: US 11,851,729 B2
(45) Date of Patent: *Dec. 26, 2023

(54) METHOD FOR RECOVERING VALUABLE METAL

(71) Applicant: SUMITOMO METAL MINING CO., LTD., Tokyo (JP)

(72) Inventor: Yu Yamashita, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/014,187

(22) PCT Filed: Jun. 21, 2021

(86) PCT No.: PCT/JP2021/023471
§ 371 (c)(1),
(2) Date: Jan. 3, 2023

(87) PCT Pub. No.: WO2022/009656
PCT Pub. Date: Jan. 13, 2022

(65) Prior Publication Data
US 2023/0212710 A1  Jul. 6, 2023

(30) Foreign Application Priority Data
Jul. 9, 2020  (JP) ................. 2020-118451

(51) Int. Cl.
*C22B 7/00* (2006.01)
*C22B 1/02* (2006.01)
(Continued)

(52) U.S. Cl.
CPC ............. *C22B 7/003* (2013.01); *C22B 1/02* (2013.01); *C22B 9/10* (2013.01); *C22B 15/005* (2013.01); *C22B 23/02* (2013.01); *H01M 10/54* (2013.01)

(58) Field of Classification Search
CPC ........... C22B 7/00; C22B 7/001; C22B 7/004; C22B 1/00; C22B 1/02; C22B 1/04;
(Continued)

(56) References Cited

U.S. PATENT DOCUMENTS

2014/0174256 A1  6/2014  Takahashi et al.
2021/0328283 A1  10/2021  Yamashita et al.

FOREIGN PATENT DOCUMENTS

CN   101252186 A   8/2008
CN   103380218 A   10/2013
(Continued)

OTHER PUBLICATIONS

Danczak, Anna et al., "Behavior of Battery Metals Lithium, Cobalt, Manganese, and Lanthanum in Black Copper Smelting," Batteries, Mar. 2, 2020, pp. 1-17. (cited in the May 22, 2023 OA issued for U.S. Appl. No. 18/014,193).

(Continued)

Primary Examiner — Vanessa T. Luk
Assistant Examiner — Nikolas Takuya Pullen
(74) Attorney, Agent, or Firm — Locke Lord LLP; James E. Armstrong, IV; Nicholas J. DiCeglie, Jr.

(57) ABSTRACT

The present invention provides a method which is capable of more strictly controlling the oxygen partial pressure required during the melting of a starting material, thereby being capable of recovering a valuable metal more efficiently. A method for recovering valuable metals (Cu, Ni, Co), said method comprising the following steps: a step for preparing, as a starting material, a charge that contains at least phosphorus (P), manganese (Mn) and valuable metals; a step for heating and melting the starting material into a melt, and subsequently forming the melt into a molten material that contains an alloy and slag; and a step for recovering the alloy that contains valuable metals by separating the slag from the (Continued)

molten material. With respect to this method for recovering valuable metals, the oxygen partial pressure in the melt is directly measured with use of an oxygen analyzer when the starting material is heated and melted.

3 Claims, 1 Drawing Sheet

(51) Int. Cl.
*C22B 9/10* (2006.01)
*C22B 15/00* (2006.01)
*C22B 23/02* (2006.01)
*H01M 10/54* (2006.01)

(58) Field of Classification Search
CPC .... C22B 1/06; C22B 1/08; C22B 1/10; C22B 9/00; C22B 15/00; C22B 15/0026; C22B 15/0028; C22B 15/005; C22B 15/0052; C22B 15/0056; C22B 23/00
See application file for complete search history.

(56) References Cited

FOREIGN PATENT DOCUMENTS

| | | |
|---|---|---|
| EP | 3269832 A1 | 1/2018 |
| JP | 361-261445 A | 11/1986 |
| JP | H08-013052 A | 1/1996 |
| JP | 2003-160819 A | 6/2003 |
| JP | 2009-041052 A | 2/2009 |
| JP | 2012-172169 A | 9/2012 |
| JP | 2013-064177 A | 4/2013 |
| JP | 5853585 B2 | 2/2016 |
| JP | 2017-526820 A | 9/2017 |
| JP | 6542354 B2 | 7/2019 |
| JP | 2019-135321 A | 8/2019 |
| KR | 10-2007-0046990 A | 5/2007 |
| KR | 10-2013-0114723 A | 10/2013 |
| WO | 2016/023778 A1 | 2/2016 |
| WO | 2020/013294 A1 | 1/2020 |

OTHER PUBLICATIONS

Office Action issued in the U.S. Appl. No. 18/014,200, dated Aug. 25, 2023.

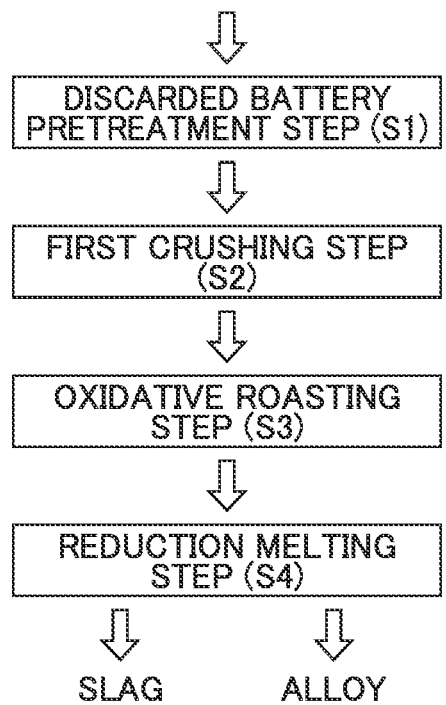

METHOD FOR RECOVERING VALUABLE METAL

CROSS REFERENCE TO RELATED APPLICATIONS

This application is related to two co-pending applications: "METHOD FOR RECOVERING VALUABLE METAL" filed even date herewith in the names of Yu Yamashita; Toshihiko Nagakura; and Tomoya Hagio as a national phase entry of PCT/JP2021/024638; and METHOD FOR RECOVERING VALUABLE METAL" filed even date herewith in the name of Yu Yamashita as a national phase entry of PCT/JP2021/023472; which applications are assigned to the assignee of the present application and all three incorporated by reference herein.

TECHNICAL FIELD

The present invention relates to a method for recovering valuable metals.

BACKGROUND ART

In recent years, lithium ion batteries have become popular as lightweight and high-power batteries. A well-known lithium ion battery has a structure in which a negative electrode material, a positive electrode material, a separator, and an electrolytic solution are enclosed in an outer can. The outer can is made of metals, such as iron (Fe) and aluminum (Al). The negative electrode material is made of a negative electrode active material (graphite etc.) fixed to a negative electrode current collector (copper foil etc.). The positive electrode material is made of a positive electrode active material (lithium nickelate, lithium cobaltate, etc.) fixed to a positive electrode current collector (aluminum foil etc.). The separator is made of a polypropylene porous resin film or the like. The electrolytic solution contains an electrolyte, such as lithium hexafluorophosphate ($LiPF_6$).

One of the major applications of lithium ion batteries is for hybrid and electric vehicles. Therefore, it is expected that a large amount of lithium ion batteries installed in automobiles will be discarded in the future, according to the life cycle of the automobiles. Further, there are lithium ion batteries that are discarded as defective during production. There is a need to recycle such used batteries and defective batteries produced during production (hereafter referred to as "discarded lithium ion batteries") as resources.

As a recycling method, a pyrometallurgical process, in which discarded lithium ion batteries are completely melted in a high-temperature furnace (melting furnace), has been conventionally proposed. The pyrometallurgical process is a method of melting crushed discarded lithium ion batteries, and separating and recovering valuable metals to be recovered, such as cobalt (Co), nickel (Ni), and copper (Cu), from low value-added metals, such as iron (Fe) and aluminum (Al), using the difference in oxygen affinity between them. In this method, low value-added metals are oxidized as much as possible to form slag, while valuable metals are prevented as much as possible from being oxidized and are recovered as an alloy.

In the pyrometallurgical process, which separates and recovers valuable metals by using the difference in oxygen affinity, it is very important to control the degree of redox during the melting treatment. That is, if control is insufficient, impurities are mixed into the alloy that is supposed to be recovered as valuable metals, or oxidized valuable metals are incorporated into the slag that is supposed to be recovered as impurities. These problems reduce the recovery ratio of valuable metals. Therefore, in the pyrometallurgical process, the degree of redox has been conventionally controlled by introducing an oxidant, such as air or oxygen, or a reducing agent into the melting furnace.

For example, Patent Document 1 discloses a process for the separation of cobalt from lithium present in a charge containing lithium ion batteries or battery scrap, wherein oxygen input to a bath is preferably adjusted to achieve a target oxygen pressure between $10^{-18}$ and $10^{-14}$ atm inclusive, the upper limit ($10^{-14}$ atm) precludes the formation of cobalt oxides and its loss in the slag, and the lower limit ($10^{-18}$ atm) ensures that elements, such as aluminum and carbon, are oxidized (claim 1 and paragraph [0018] of Patent Document 1).

Further, with regard to a method for recovering valuable metals from a discarded lithium ion battery containing nickel and cobalt, Patent Document 2 discloses: that the degree of oxidation can be strictly controlled by adjusting the amount of oxygen, oxidation time, and temperature in a preliminary oxidation step; that almost the entire amount of aluminum oxide can be separated as slag in a slag separation step by adjusting the degree of oxidation; that additional oxidation treatment for a short period of time is performed in a melting step; and that the additional oxidation step enables finer adjustment of an appropriate degree of oxidation (claim 1 and paragraphs [0033] and [0036] of Patent Document 2).

Patent Document 1: Japanese Patent No. 6542354
Patent Document 2: Japanese Patent No. 5853585

DISCLOSURE OF THE INVENTION

Problems to be Solved by the Invention

Thus, in the recovery of valuable metals by the pyrometallurgical process, it has been proposed to control the degree of redox by introducing air or oxygen during the melting treatment; however, there was room for improvement in this method. That is, in order to recover valuable metals efficiently, it is important to more strictly control the degree of redox (oxygen partial pressure). For example, discarded lithium ion batteries contain a large amount of impurities, such as carbon (C), aluminum (Al), fluorine (F), and phosphorus (P). Phosphorus is relatively easily reduced among these impurities. Therefore, if the degree of redox is not strictly controlled, phosphorus may be mixed into the alloy that is supposed to be recovered as valuable metals. In the treatment of discarded lithium ion batteries containing manganese (Mn), if the degree of redox is not strictly controlled, a large amount of manganese remains in the alloy. On the other hand, if the degree of reduction is excessively low, valuable metals, especially cobalt, are oxidized and cannot be recovered as an alloy.

In this respect, conventionally proposed methods are insufficient to control the degree of redox (oxygen partial pressure). For example, in Patent Document 1, the material balance for Cu, Ni, Fe, Co, Al, Si, and Ca has been studied (Table 1 of Patent Document 1); however, the problem of contamination of phosphorus and manganese in the alloy is not recognized. Further, in Patent Document 1, the oxidation level ($PO_2$) is determined by analyzing gas directly above a melting bath (paragraph [0022] of Patent Document 1); however, with such a method, it is difficult to accurately measure and control the oxygen partial pressure. Therefore, in particular, there is the problem that it is not possible to prevent the incorporation of phosphors into the alloy. In fact, as a result of the investigation conducted by the present inventor, it was found that phosphorus and manganese may be mixed into the alloy under the oxygen partial pressure condition of less than $10^{-14}$ atm, which is preferable in Patent Document 1.

In addition, the method proposed in Patent Document 2 further includes a dephosphorization step after the melting step and the slag separation step, and phosphorus is separated from the alloy in this dephosphorization step (claim 1 and paragraphs [0039] to [0046] of Patent Document 2). Although phosphorus can be removed by such a method, in order to further reduce the production costs, it is desirable to have a process that enables removal of phosphorus and manganese while eliminating the need for the dephosphorization step. Patent Document 2 does not disclose any measures necessary to achieve such a process.

The present inventor conducted intensive studies in view of these circumstances. As a result, the present inventor found that the oxygen partial pressure in the molten material is directly measured using an oxygen analyzer during melting of the raw material, and the oxygen partial pressure is controlled based on the obtained measurement result, whereby the oxygen partial pressure can be strictly controlled, and that it is thereby possible to suppress the incorporation of phosphorus and manganese into the alloy while preventing the oxidation of valuable metals, consequently enabling more sufficient recovery of valuable metals.

The present invention has been completed based on these findings, and an object of the present invention is to provide a method that can strictly control the oxygen partial pressure necessary during heating and melting of a raw material, thereby enabling more efficient recovery of valuable metals.

Means for Solving the Problems

The present invention includes the following aspects (1) to (6). In the present specification, the expression "to" includes the endpoints X and Y. That is, "X to Y" is synonymous with "X or more and Y or less".

(1) A method for recovering a valuable metal (Cu, Ni, and/or Co), the method comprising the following steps: a step of preparing, as a raw material, a charge comprising at least phosphorus (P), manganese (Mn), and the valuable metal; a step of heating and melting the raw material into a melt, and then forming the melt into a molten material comprising an alloy and slag; and a step of separating the slag from the molten material and recovering the alloy comprising the valuable metal, an oxygen partial pressure in the melt being directly measured using an oxygen analyzer during heating and melting of the raw material, the oxygen partial pressure being controlled based on the obtained measurement result.

(2) The method according to (1) above, wherein the oxygen partial pressure is controlled to be within a range of $10^{-13.0}$ (atm) or more and $10^{-8.0}$ (atm) or less.

(3) The method according to (1) or (2) above, wherein the oxygen partial pressure is controlled to be within a range of $10^{-13.0}$ (atm) or more and $10^{-11.0}$ (atm) or less.

(4) The method according to any one of (1) to (3) above, wherein a heating temperature during heating and melting of the raw material is set to 1300° C. or more and 1500° C. or less.

(5) The method according to any one of (1) to (4) above, wherein the valuable metal consists of at least one metal or alloy selected from the group consisting of copper (Cu), nickel (Ni), cobalt (Co), and a combination thereof.

(6) The method according to any one of (1) to (5) above, wherein the charge comprises a discarded lithium ion battery.

Effects of the Invention

The present invention provides a method that can strictly control the oxygen partial pressure during heating and melting of a raw material, thereby enabling more efficient recovery of valuable metals.

BRIEF DESCRIPTION OF THE DRAWINGS

FIG. 1 shows an example of the method for recovering valuable metals.

PREFERRED MODE FOR CARRYING OUT THE INVENTION

A specific embodiment of the present invention (hereinafter referred to as "the present embodiment") will be described. The present invention is not limited to the following embodiment, and various modifications can be made without changing the spirit of the present invention.

The method for recovering a valuable metal (Cu, Ni, and/or Co) according to the present embodiment includes the following steps: a step of preparing, as a raw material, a charge containing at least phosphorus (P), manganese (Mn), and the valuable metal (preparation step); a step of heating and melting the prepared raw material into a melt, and then forming the melt into a molten material containing an alloy and slag (melting step); and a step of separating the slag from the obtained molten material and recovering the alloy containing the valuable metal (slag separation step). Further, the oxygen partial pressure in the melt is directly measured using an oxygen analyzer during heating and melting of the raw material, and the oxygen partial pressure is controlled based on the obtained measurement result.

The present embodiment is a method for recovering a valuable metal from a charge containing at least phosphorus (P), manganese (Mn), and the valuable metal. The valuable metal is the target for recovery, and is at least one metal or alloy selected from the group consisting of copper (Cu), nickel (Ni), cobalt (Co), and a combination thereof. In addition, the present embodiment is a recovery method mainly based on a pyrometallurgical process. The method may be composed of a pyrometallurgical process and a hydrometallurgical process. The details of each step will be described below.

<Preparation Step>

In the method of the present embodiment, a charge is prepared to obtain a raw material in the preparation step. The charge is the target for treatment to recover valuable metals, and contains at least one valuable metal selected from the group consisting of copper (Cu), nickel (Ni), cobalt (Co), and a combination thereof, in addition to phosphorus (P) and manganese (Mn). The charge may contain these components (P, Mn, Cu, Ni, and Co) in the form of metals or elements, or in the form of compounds, such as oxides. The charge may also contain inorganic components and organic components other than these components (P, Mn, Cu, Ni, and Co).

The target of the charge is not particularly limited. Examples include discarded lithium ion batteries, electronic components containing dielectric or magnetic materials, and electronic equipment. The form of the charge is also not limited as long as it is suitable for the treatment in the subsequent steps. In the preparation step, the charge may be crushed or otherwise processed into a suitable form. Further, in the preparation step, the charge may be subjected to a heating and/or sorting treatment to remove unnecessary components, such as moisture and organic matter.

<Melting Step>

In the method of the present embodiment, the prepared raw material is melted to separate it into an alloy (metal) and slag in the melting step. Specifically, the raw material is heated and melted into a melt. The melt contains an alloy and slag in the molten state. Then, the obtained melt is formed into a molten material. The molten material contains the alloy and slag in the solidified state. The alloy mainly contains valuable metals. Therefore, the valuable metals and other components can be separated as an alloy and slag, respectively. This is because low value-added metals (Al etc.) have a high oxygen affinity, whereas valuable metals have a low oxygen affinity. For example, aluminum (Al), lithium (Li), carbon (C), manganese (Mn), phosphorus (P), iron (Fe), cobalt (Co), nickel (Ni), and copper (Cu) are generally oxidized in the order of Al>Li>C>Mn>P>Fe>Co>Ni>Cu. That is, aluminum (Al) is most likely to be oxidized, and copper (Cu) is least likely to be oxidized. Therefore, low value-added metals (Al etc.) are easily oxidized to slag, and valuable metals (Cu, Ni, and Co) are reduced to metal (alloy). Thus, low value-added metals and valuable metals can be separated as slag and an alloy, respectively.

In the method of the present embodiment, the oxygen partial pressure in the melt is directly measured using an oxygen analyzer during heating and melting of the raw material, and the oxygen partial pressure is controlled based on the obtained measurement result. This makes it possible to strictly control the degree of redox in the melt, consequently separating valuable metals and impurities with high accuracy. To explain this point, if the degree of redox (the amount of carbon and the oxidation number and amount of metal) in raw materials can be accurately grasped in advance, it is possible, in principle, to control the degree of redox in the melt simply by adjusting the blending amount of raw materials during the raw material preparation process. However, in practice, raw materials are not uniform. Sampling error occurs during raw material analysis, and this error makes it difficult to control the degree of redox to the target value.

Patent Document 1 has proposed a method for analyzing gas above a melting bath. However, such a method has large measurement error and is not considered to be highly reliable. That is, inside the melting furnace where oxygen is being introduced, the oxygen partial pressure is not in equilibrium and is constantly fluctuating. Therefore, the oxygen partial pressure varies greatly depending on location and time. If the atmospheric gas contains dust, the dust may adhere to the probe of the gas analyzer and interfere with accurate measurement. For this reason, it is difficult to accurately determine the degree of redox (oxygen partial pressure) in the melt by the method for analyzing gas above a melting bath.

In contrast, the oxygen partial pressure in the melt is directly measured in the method of the present embodiment; thus, the obtained measured value precisely reflects the actual degree of redox in the melt. Therefore, if the degree of redox in the melt is outside the target value, the oxygen partial pressure can be controlled by introducing a reducing agent or an oxidant, thereby matching the degree of redox in the melt to the target value with high accuracy. As a result, even if elements with similar oxygen affinities, such as phosphorus and cobalt, are contained in the melt, they can be separated with high accuracy.

The method for measuring the oxygen partial pressure in the melt is not particularly limited. For example, there is a method of using an oxygen analyzer equipped with an oxygen sensor (oxygen probe), and inserting the oxygen sensor so that its tip is immersed in the melt. As the oxygen sensor, a known sensor, such as a zirconia solid electrolytic sensor, may be used. The method is not limited as long as it can directly measure the oxygen partial pressure in the melt.

The control of the oxygen partial pressure may be performed by a known method. For example, there is a method of introducing a reducing agent or an oxidant into the raw material or a melt thereof. As the reducing agent, a high carbon grade material (graphite powder, graphite particles, coal, coke, etc.) or carbon monoxide can be used. Alternatively, a high carbon grade component among the raw materials can be used as the reducing agent. As the oxidant, an oxidizing gas (air, oxygen, etc.) or a low carbon grade material can be used. Alternatively, a low carbon grade component among the raw materials can be used as the oxidant.

Introduction of a reducing agent or an oxidant may also be performed by a known method. When the reducing agent or oxidant is a solid substance, it may be put into the raw material or melt. When the reducing agent or oxidant is a gaseous substance, it may be introduced through a lance or other inlet provided in the melting furnace. The timing of introduction of the reducing agent or oxidant is also not limited. The reducing agent or oxidant may be introduced at the same time when the raw material is put into the melting furnace, or the reducing agent or oxidant may be introduced at the stage when the raw material is melted into a melt. Preferably, the reducing agent or oxidant is introduced into the melting furnace simultaneously with the raw material, the oxygen partial pressure in a melt is measured at the stage when the raw material is melted into the melt, and whether the reducing agent or oxidant is additionally introduced is determined based on the obtained result. If the measured oxygen partial pressure is outside the target value, the reducing agent or oxidant may be additionally introduced, whereas if the measured value is close to the target value, additional introduction is not necessary.

The oxygen partial pressure in the melt is preferably controlled to be within the range of $10^{-13.0}$ (atm) or more and $10^{-8.0}$ (atm) or less during heating and melting of the raw material. This makes it possible to recover valuable metals even more efficiently. If the oxygen partial pressure is less than $10^{-13.0}$ (atm), the degree of reduction in the melt is too high, and phosphorus and manganese as impurities may be reduced and mixed into the alloy. In contrast, if the oxygen partial pressure exceeds $10^{-8.0}$ (atm), cobalt as a valuable metal may be oxidized and incorporated into the slag. More preferably, the oxygen partial pressure is controlled to be within the range of $10^{-13.0}$ (atm) or more and $10^{-11.0}$ (atm) or less.

In the treatment in the melting step, flux may be introduced (added) to the raw material. The addition of flux can lower the melting treatment temperature and further enhance the removal of phosphorus (P) and manganese (Mn). The flux is preferably one containing elements that form basic oxides with low melting points by incorporating impurity elements. Since phosphorus becomes an acidic oxide when oxidized, the more basic the slag formed in the melting step is, the easier it is to remove phosphorus by incorporating it into the slag. More preferred among these are those containing calcium compounds, which are inexpensive and stable at room temperature. Examples of calcium compounds include calcium oxide (CaO) and calcium carbonate ($CaCO_3$).

The heating temperature during heating and melting of the raw material is not particularly limited, but is preferably set to 1300° C. or more and 1500° C. or less. When the heating temperature is set to 1300° C. or more, valuable metals (Cu, Co, and Ni) are sufficiently melted and form an alloy with enhanced fluidity. Therefore, the alloy and slag can be separated efficiently in the slag separation step, described later. The heating temperature is more preferably 1350° C. or more. In contrast, if the heating temperature exceeds 1500° C., thermal energy is consumed wastefully, wear of refractory materials, such as crucible and furnace walls, increases, and productivity may be reduced. The heating temperature is more preferably 1450° C. or less.

<Preheating Step>

If necessary, a step of preheating (oxidative roasting) the raw material to obtain a preheated material (oxidatively roasted material) (preheating step) may be provided before the melting step. In the preheating step (oxidative roasting step), the raw material is preheated to reduce the amount of carbon contained in the raw material. By providing such a preheating step, even if the raw material (charge etc.) contains an excessive amount of carbon, the carbon can be removed by oxidation, which can facilitate the integration of valuable metals into an alloy in the subsequent melting step. That is, in the melting step, valuable metals are reduced into localized molten particles. Carbon may be a physical barrier to the aggregation of the molten particles (valuable metals). Therefore, if the preheating step is not provided, carbon may hinder the aggregation and integration of the molten particles and the resulting separation of the alloy (metal) and slag, and the recovery ratio of valuable metals may decrease. In contrast, by providing the preheating step in advance to remove carbon from the raw material, the aggregation and integration of the molten particles (valuable metals) progress in the melting step, making it possible to further enhance the recovery ratio of valuable metals. Since phosphorus (P) and manganese (Mn) are relatively easily reduced impurities, if there is an excessive amount of carbon, phosphorus and manganese may be reduced and incorporated into the alloy together with valuable metals. Phosphorus and manganese can be prevented from being mixed into the alloy by removing the excessive amount of carbon in advance. The amount of carbon in the preheated material is preferably less than 1 mass %.

In addition, it is possible to suppress the variation in oxidation by providing the preheating step. In the preheating step, it is desirable to perform treatment (oxidative roasting) at a degree of oxidation that can oxidize low value-added metals (Al etc.) contained in the raw material (charge etc.). On the other hand, the degree of oxidation can be easily controlled by adjusting the preheating temperature, time, and/or atmosphere. Therefore, by the preheating step, the degree of oxidation can be more strictly adjusted, and the variation in oxidation can be suppressed.

The degree of oxidation is adjusted in the following manner. As described above, aluminum (Al), lithium (Li), carbon (C), manganese (Mn), phosphorus (P), iron (Fe), cobalt (Co), nickel (Ni), and copper (Cu) are generally oxidized in the order of Al>Li>C>Mn>P>Fe>Co>Ni>Cu. In the preheating treatment in the preheating step, oxidation proceeds until the entire amount of aluminum (Al) is oxidized. Oxidation may be accelerated until part of iron (Fe) is oxidized; however, the degree of oxidation is limited to the extent that cobalt (Co) is not oxidized and distributed to the slag.

Preheating is preferably performed in the presence of an oxidant. This enables efficient oxidation removal of impurity carbon (C) and oxidation of aluminum (Al). The oxidant is not particularly limited, but is preferably an oxygen-containing gas (air, pure oxygen, oxygen-rich gas, etc.) in terms of easy handling. The amount of the oxidant to be introduced is preferably, for example, about 1.2 times the chemical equivalent required for oxidation of each substance to be oxidized.

The heating temperature for preheating is preferably 700° C. or more and 1100° C. or less. At 700° C. or more, the efficiency of carbon oxidation can be further enhanced, and the oxidation time can be reduced. At 1100° C. or less, thermal energy costs can be minimized, and the efficiency of preheating can be enhanced. The preheating temperature may be 800° C. or more. Further, the preheating temperature may be 900° C. or less.

Preheating can be performed by using a known roasting furnace. It is preferable to use a furnace (pre-furnace) different from the melting furnace used in the treatment in the subsequent melting step, and to perform preheating in the pre-furnace. As the preheating furnace, any type of furnace can be used as long as it is capable of performing oxidation treatment inside the furnace by supplying an oxidant (oxygen etc.) while roasting the charge. Examples include conventionally known rotary kilns and tunnel kilns (hearth furnaces).

<Slag Separation Step>

In the slag separation step, the slag is separated from the molten material obtained in the melting step, and the alloy containing valuable metals is recovered. The slag and alloy are different in specific gravity. Therefore, the slag, which has a lower specific gravity than the alloy, gathers in the upper part of the alloy and thus can be easily separated and recovered by specific gravity separation.

A sulfurization step of sulfurizing the obtained alloy and a crushing step of crushing the obtained sulfide or alloy may be provided after the slag separation step. Further, a hydrometallurgical process may be performed on the alloy containing valuable metals obtained after such a pyrometallurgical process. By the hydrometallurgical process, impurity components can be removed, valuable metals (Cu, Ni, and Co) can be separated and purified, and each metal can be recovered. Examples of the treatment in the hydrometallurgical process include neutralization, solvent extraction, and other known treatments.

According to the method of the present embodiment as described above, the oxygen partial pressure in the melt can be strictly controlled, thereby preventing the oxidation of valuable metals and suppressing the incorporation of phosphorus and manganese into the alloy. As a result, valuable metals can be more efficiently recovered. For example, the phosphorus content of the alloy (phosphorus grade in the metal) can be set to 0.50 mass % or less, 0.10 mass % or less, 0.05 mass % or less, 0.03 mass % or less, or 0.01 mass % or less. The manganese content of the alloy (manganese grade in the metal) can be set to 2.0 mass % or less, 1.0 mass % or less, 0.1 mass % or less, or 0.01 mass % or less. Further, the recovery ratio of valuable metals can be increased to 90.0 mass % or more, 95.0 mass % or more, 97.0 mass % or more, 99.0 mass % or more, or 99.5 mass % or more. The recovery ratio of valuable metals is calculated according to the following formula (1) using the valuable metal contents of the finally obtained alloy and slag.

[Eq. 1]

$$\text{Valuable metal recovery ratio(mass\%)} = \frac{\text{valuable metal content in alloy}}{\text{valuable metal content in alloy} + \text{valuable metal content in slag}} \times 100 \quad (1)$$

The charge of the present embodiment is not particularly limited as long as it contains valuable metals; however, the charge preferably contains a discarded lithium ion battery. Discarded lithium ion batteries contain lithium (Li) and valuable metals (Cu, Ni, and Co), as well as low value-added metals (Al and Fe) and carbon components. Therefore, the use of such a discarded lithium ion battery as the charge enables efficient separation and recovery of valuable metals. The phrase "discarded lithium ion battery" is a concept including not only used lithium ion batteries, but also defective products produced in the production process of positive electrode materials etc., which constitute batteries, residual materials during the production process, and waste materials, such as scrap, generated in the production process of lithium ion batteries. Therefore, discarded lithium ion batteries can also be referred to as lithium ion battery waste materials.

The method for recovering valuable metals from a discarded lithium ion battery will be described using FIG. 1. FIG. 1 is a flow chart showing an example of the recovery method. As shown in FIG. 1, this method includes a step of removing an electrolytic solution and outer can from a discarded lithium ion battery to obtain a discarded battery content (discarded battery pretreatment step S1), a step of crushing the discarded battery content to obtain a crushed material (first crushing step S2), a step of preheating the crushed material to obtain a preheated material (preheating step S3), a step of melting the preheated material to obtain a molten material (melting step S4), and a step of separating slag from the molten material and recovering an alloy (slag separation step). Although it is not shown, a sulfurization step of sulfurizing the obtained alloy and a second crushing step of crushing the obtained sulfide or alloy may be provided after the slag separation step. The details of each step will be described below.

<Discarded Battery Pretreatment Step>

The discarded battery pretreatment step (S1) is performed for the purpose of explosion prevention and detoxification of the discarded lithium ion battery and removal of the outer can. Since the lithium ion battery is a closed system, it contains an electrolytic solution etc. inside. Therefore, if the battery is crushed in its original state, it may explode, which is dangerous. It is preferable to perform discharge treatment or electrolytic solution removal treatment by using some kind of method. Outer cans are often made of aluminum (Al) and iron (Fe), which are metals, and it is relatively easy to recover such metal outer cans as they are. Thus, the electrolytic solution and outer can are removed in the discarded battery pretreatment step (S1), whereby safety can be enhanced, and the recovery ratio of valuable metals (Cu, Ni, and Co) can be increased.

The specific method of discarded battery pretreatment is not particularly limited. For example, the electrolytic solution is removed by physically opening holes in the discarded battery with the tip of a needle-like blade. Another method is to heat the discarded battery and burn the electrolytic solution to detoxify it.

When aluminum (Al) and iron (Fe) contained in the outer can are recovered in the discarded battery pretreatment step (S1), after crushing, the crushed material may be sieved using a sieve shaker. Aluminum (Al) can be recovered efficiently because it is easily crushed to powder by light crushing. Iron (Fe) contained in the outer can may be recovered by magnetic sorting.

<First Crushing Step>

In the first crushing step (S2), the discarded lithium ion battery content is crushed to obtain a crushed material. This step is intended to enhance the reaction efficiency of the pyrometallurgical process. The recovery ratio of valuable metals (Cu, Ni, and Co) can be increased by enhancing the reaction efficiency. The specific crushing method is not particularly limited. The discarded lithium ion battery content can be crushed using a conventionally known crusher, such as a cutter-mixer. The discarded battery pretreatment step and the first crushing step, taken together, correspond to the preparation step described above.

<Preheating Step>

In the preheating step (oxidative roasting step) (S3), the crushed material obtained in the first crushing step (S2) is preheated (oxidatively roasted) to obtain a preheated material (oxidatively roasted material). The details of this step are as described above.

<Melting Step>

In the melting step (S4), the preheated material obtained in the preheating step (S3) is melted to obtain a molten material. The details of this step are as described above.

<Slag Separation Step>

In the slag separation step, the slag is separated from the molten material obtained in the melting step (S4), and the alloy is recovered. The details of this step are as described above.

A sulfurization step and a crushing step may be provided after the slag separation step. Further, a hydrometallurgical process may be performed on the obtained valuable metal alloy. The details of the sulfurization step, crushing step, and hydrometallurgical process are as described above.

EXAMPLES

The present invention will be described in more detail using the following Examples and Comparative Examples. However, the present invention is not limited to the following Examples.

(1) Recovery of Valuable Metals

Example 1

Valuable metals were recovered using discarded lithium ion batteries as the charge. Recovery was performed according to the following steps.

<Discarded Battery Pretreatment Step (Preparation Step)>

Used batteries and defective products collected in the battery production process were prepared as the discarded lithium ion batteries. The discarded lithium ion batteries were collectively immersed in salt water to discharge, and the moisture was then removed, followed by roasting in the air at 260° C. to decompose and remove electrolytic solutions and outer cans, thereby obtaining battery contents. The main elemental composition of the battery contents was as shown in Table 1 below.

[Table 1]

TABLE 1

Main elemental composition of battery contents
Main elemental composition of battery contents (mass %)

| Copper | Nickel | Cobalt | Phosphorus | Manganese | Aluminum | Carbon |
|---|---|---|---|---|---|---|
| 18 | 22 | 4 | 0.4 | 4 | 5 | 25 |

<Crushing Step>

The obtained battery contents were crushed with a crusher (trade name: Good Cutter, produced by Ujiie Manufacturing Co., Ltd.) to obtain a crushed material.

<Preheating Step>

The obtained crushed material was put into a rotary kiln, and preheated in the air at 800° C. for 180 minutes, thereby obtaining a raw material to be heated and melted.

<Melting Step>

To the preheated crushed material (raw material to be heated and melted), calcium oxide (CaO) and silicon dioxide ($SiO_2$) were added as flux, and graphite powder was further added as a reducing agent, followed by mixing. The obtained mixture was inserted into an alumina crucible, and this was heated and melted at a temperature of 1400° C. by resistance heating to form a melt. Thereafter, a molten material containing an alloy and slag was obtained from the melt.

The oxygen partial pressure in the melt was directly measured using an oxygen analyzer during melting of the raw material, and the oxygen partial pressure was controlled to $10^{-12.9}$ (atm). Specifically, using an oxygen analyzer equipped with an oxygen probe (Kawaso Electric Industrial Co., Ltd., OXT-O) at its tip, the oxygen probe was inserted so that its tip was directly immersed in the melt. The oxygen probe was provided with a zirconia solid electrolytic sensor. After waiting for the measured partial oxygen pressure to be steady, the measured value was read. The oxygen partial pressure was controlled by adjusting the amount of the reducing agent (graphite powder) added.

<Slag Separation Step>

The slag was separated from the obtained molten material using the difference in specific gravity, and the alloy in the molten state was recovered.

Example 2

The oxygen partial pressure was controlled to $10^{-8.0}$ (atm) by changing the amount of the reducing agent (graphite powder) added in the melting step. Valuable metals were recovered in the same manner as in Example 1 except for the above.

Example 3

The oxygen partial pressure was controlled to $10^{-13.0}$ (atm) by changing the amount of the reducing agent (graphite powder) added in the melting step. Further, the heating temperature was changed to 1330° C. Valuable metals were recovered in the same manner as in Example 1 except for the above.

Example 4

The oxygen partial pressure was controlled to $10^{-12.0}$ (atm) by changing the amount of the reducing agent (graphite powder) added in the melting step. Further, the heating temperature was changed to 1480° C. Valuable metals were recovered in the same manner as in Example 1 except for the above.

Example 5

The oxygen partial pressure was controlled to $10^{-7.6}$ (atm) by changing the amount of the reducing agent (graphite powder) added in the melting step. Valuable metals were recovered in the same manner as in Example 1 except for the above.

Example 6

The oxygen partial pressure was controlled to $10^{-13.9}$ (atm) by changing the amount of the reducing agent (graphite powder) added in the melting step. Valuable metals were recovered in the same manner as in Example 1 except for the above.

(2) Evaluation

The alloys (metals) recovered in Examples 1 to 6 were subjected to elemental analysis using an ICP analyzer (Agilent Technologies, Agilent 5100 SUDV). The elements analyzed herein were nickel (Ni), cobalt (Co), and copper (Cu), which are valuable metals, and phosphorus (P) and manganese (Mn), which are impurities difficult to remove from metal.

Then, the contents (mass %) of phosphorus (P) and manganese (Mn) in the alloy (metal) were defined as the phosphorus grade and manganese grade, respectively. The recovery ratio of valuable metals was determined in the following manner. That is, using the contents of valuable metals (Cu, Ni, and Co) in the alloy and slag determined by elemental analysis, the recovery ratio of valuable metals was calculated according to the following formula (1).

[Eq. 2]

$$\text{Valuable metal recovery ratio(mass\%)} = \frac{\text{valuable metal content in alloy}}{\text{valuable metal content in alloy} + \text{valuable metal content in slag}} \times 100 \quad (1)$$

(3) Results

Table 2 shows the phosphorus grade, manganese grade, and valuable metal recovery ratio obtained in Examples 1 to 6. As is clear from the results of Table 2, the oxygen partial pressure in the melts could be strictly controlled over the range of $10^{-13.9}$ to $10^{-7.6}$ (atm) by adjusting the amount of the reducing agent added and the heating temperature.

In the alloys obtained in Examples 1 to 4, the recovery ratio of valuable metals contained in the batteries was as high as 95% or more. The phosphorus grade in the obtained alloys was as low as less than 0.01 mass %, and the manganese grade was as low as less than 1 mass %. This revealed that the valuable metals could be obtained at a high recovery ratio, and that phosphorus and manganese could be effectively removed. On the other hand, the valuable metal recovery ratio was low in Example 5, and the phosphorus grade and manganese grade were inferior in Example 6.

[Table 2]

TABLE 2

Phosphorus grade, manganese grade in metal, and valuable metal recovery ratio

| | Oxygen partial pressure (atm) | Reduction temperature (° C.) | Phosphorus grade in metal (mass %) | Manganese grade in metal (mass %) | Valuable metal recovery ratio (%) |
|---|---|---|---|---|---|
| Example1 | $10^{-12.9}$ | 1400 | <0.01 | 0.58 | 99.8 |
| Example2 | $10^{-8.0}$ | 1400 | <0.01 | <0.01 | 96.8 |
| Example3 | $10^{-13.0}$ | 1330 | <0.01 | 0.81 | 99.8 |
| Example4 | $10^{-12.0}$ | 1480 | <0.01 | 0.07 | 98.6 |
| Example5 | $10^{-7.6}$ | 1400 | <0.01 | <0.01 | 93.1 |
| Example6 | $10^{-13.9}$ | 1400 | 0.02 | 3.3 | 99.9 |

The invention claimed is:

1. A method for recovering copper (Cu), nickel (Ni), and cobalt (Co) which are valuable metals, from a raw material comprising a discarded lithium ion battery, the method comprising:

preparing, as a raw material, a charge comprising the discarded lithium ion battery comprising at least phosphorus (P), manganese (Mn), iron (Fe) and the valuable metals;

heating and melting the raw material into a melt, and then forming the melt into a molten material comprising an alloy and slag; and separating the slag from the molten material and recovering the alloy comprising the valuable metals, the method further comprising oxidatively roasting the raw material before heating and melting the raw material, to produce an oxidatively roasted material, in the oxidatively roasting step, the raw material being oxidatively roasted at a degree of oxidation such that part of iron contained in the raw material is oxidized but cobalt is not oxidized, during the step of heating and melting of the raw material, flux comprising a calcium compound that forms a basic slag being added as well as an oxygen partial pressure in the melt being directly measured using an oxygen analyzer, the oxygen partial pressure being controlled to be within a range of $10^{-13.0}$ (atm) or more and $10^{-8.0}$ (atm) or less, based on the obtained measurement result, the method being devoid of a dephosphorization step of removing phosphorus from the alloy after separating the slag from the molten material and recovering the alloy, wherein the alloy recovered comprises phosphorus in a content of 0.50 mass % or less and manganese in a content of 2.0 mass % or less.

2. The method according to claim 1, wherein the oxygen partial pressure is controlled to be within a range of $10^{-13.0}$ (atm) or more and $10^{-11.0}$ (atm) or less.

3. The method according to claim 1, wherein a heating temperature during the step of heating and melting of the raw material is set to 1300° C. or more and 1500° C. or less.

* * * * *